United States Patent
Himayat et al.

(10) Patent No.: US 6,574,202 B1
(45) Date of Patent: Jun. 3, 2003

(54) METHOD FOR INTERLEAVING INFORMATION CONVEYED IN A WIRELESS COMMUNICATION SYSTEM

(75) Inventors: Nageen Himayat, Pinebrook, NJ (US); James Paul Seymour, Lake Hiawatha, NJ (US); Andrea M. Tonello, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/353,233

(22) Filed: Jul. 14, 1999

(51) Int. Cl.[7] ................................................. H04Q 7/00
(52) U.S. Cl. ...................................... 370/329; 370/337
(58) Field of Search ................................. 370/329, 337, 370/347, 328, 336, 332, 348, 345

(56) References Cited

U.S. PATENT DOCUMENTS

| | | | | | |
|---|---|---|---|---|---|
| 5,559,804 | A | * | 9/1996 | Amada et al. | 370/347 |
| 6,014,761 | A | * | 1/2000 | Lachish et al. | 714/702 |
| 6,072,987 | A | * | 6/2000 | Willey | 340/7.43 |
| 6,411,613 | B1 | * | 6/2002 | Seymour et al. | 370/347 |

* cited by examiner

*Primary Examiner*—Nguyen T. Vo
*Assistant Examiner*—Nghi H. Ly (57) ABSTRACT

A method for interleaving information to be conveyed over a TDMA wireless communication system. A certain portion of information associated with a user is transmitted during one time slot and the remaining information for that user is intermingled with other information for that user and transmitted in a subsequent time slot.

24 Claims, 5 Drawing Sheets

METHOD FOR INTERLEAVING INFORMATION CONVEYED IN A WIRELESS COMMUNICATION SYSTEM

BACKGROUND OF THE INVENTION

1. Field of the Invention

The present invention is directed to the transmission and reception of information in a wireless communication system and more particularly to a method of interleaving information conveyed over a wireless communication system.

2. Description of the Related Art

Wireless telecommunication systems use various schemes to allow multiple users to use (i.e., share simultaneously) a particular bandwidth. The bandwidth is part of or all of the band of frequencies allocated to the telecommunication system for conveying (i.e., transmitting and receiving) information. The wireless telecommunication systems typically use techniques known as multiple access schemes to allow a plurality of users to share a given bandwidth. One multiple access scheme that is widely used in many wireless telecommunication systems is called Time Division Multiple Access (TDMA).

A TDMA wireless telecommunication system allows multiple users to use the same bandwidth by creating time frames (hereinafter "frames") comprising time slots (hereinafter "slots") within which each user is allowed to convey their information. Each slot or a group of slots are defined and are assigned to a particular user. Thus, each user is allowed to transmit and/or receive information in that user's assigned slot. In this manner, many users are able to use the same bandwidth thus increasing the user and/or information capacity of the system.

Figure 1:
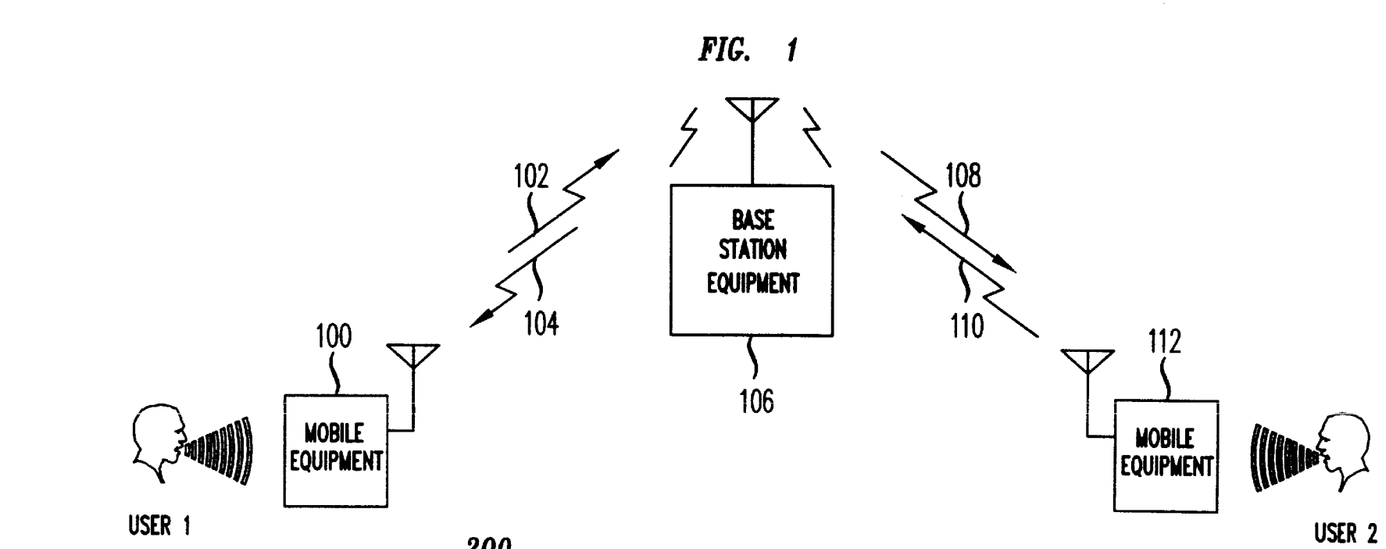
FIG. 1 depicts a portion of a wireless communication system.

FIG. 1 depicts a typical scenario in a TDMA system where user 1 is conversing with user 2. For the sake of clarity, only two users are shown. In an actual system, there is usually more than one base station and many more users throughout the system some of whom obtain access to base station 106 via a wireline telephony network such as the Public Switched Telephone Network (PSTN) (not shown). The users have mobile equipment 100 and 112 (e.g., cellular phone) which they use to communicate with each other. Base station 106 represents part of the TDMA system's equipment which relays the user information in accordance with the protocol used by the system. The protocol is a particular set of rules by which the system equipment and the user equipment initiate communication, convey information and terminate communication. Typically, protocols are established communication standards that are well defined and which are followed by many wireless telecommunication systems. Wireless communication channels 102 and 110 are commonly referred to as the uplink, which is the channel used by the users to transmit information to base station 106. Wireless communication channels 104 and 108 are commonly referred to as the downlink, which is the channel used by the users to receive information from base station 106. The information is conveyed over the uplink and downlink in the form of Radio Frequency (RF) signals. Base station equipment 106 comprises radio equipment (e.g., transmitters and receivers) and other system equipment owned by a system or network provider.

Figure 2:
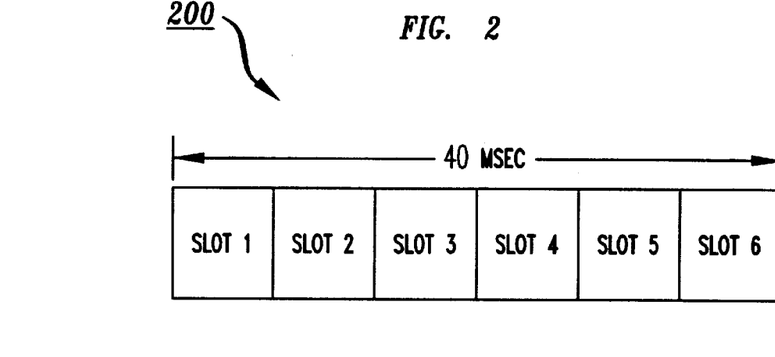
FIG. 2 depicts the frame format for a TDMA system that complies with the IS-136 standard.

FIG. 2 depicts a particular frame format used by a protocol referred to as the IS-136 standard. The IS-136 standard is a protocol used by many TDMA wireless communication systems in North America and South America. The frame format is the particular arrangement of the slots within frame 200. In particular, frame 200 has a time duration of 40 milliseconds and is divided equally into six slots. Thus, each slot has a time duration of 6.67 milliseconds. For IS-136, the frame format (i.e., six slots per frame) is the same for the uplink and the downlink.

In IS-136, either three (3) users or six (6) users are allowed to convey information within the frame format discussed above. The number of users conveying information per frame depends on the mode at which the TDMA system is operating. In IS-136 compliant systems there are two modes of operation. One mode of operation is referred to as the Full Rate mode in which each user is assigned two slots per frame. The other mode of operation is called the Half Rate mode in which each user is assigned one slot per frame. Thus, there are six users per frame in the Half Rate mode and three users per frame in the Full Rate mode. A particular slot allocation scheme in IS-136 Full Rate mode for the uplink and the downlink has a first user assigned to slots 1 and 4, a second user assigned to slots 2 and 5 and a third user assigned to slots 3 and 6.

TDMA signals, especially uplink signals, are by nature bursty signals; that is the signals for any particular user are transmitted and received as short intermittent bursts each of which carries a relatively great amount of information. The RF signals which carry the user information are exposed to various well known distorting effects such as phase jitter, frequency offset, amplitude and phase fading and multipath distortions. When a transmitted or a received burst of information is adversely affected by channel distortions, a substantial amount of the conveyed information is lost. Therefore, to reduce the likelihood of losing significant amounts of information, a certain amount of processing of the information is done prior to transmission. The intent of the processing is twofold: first it is to introduce time diversity to the information with the use of well known channel coding techniques and second, to spread out in time the burst of information with the well known technique of interleaving. The processing of information to be transmitted to mobile stations and information received from mobile stations is performed by system equipment typically located at base station 106.

Time diversity adds repetitions to the user information to reduce the likelihood of losing information due to channel distortions. The repetitions add redundancy in the information rendering said information more robust (better able to withstand noisy conditions) with respect to a noisy communication channel. The technique of interleaving spreads out a burst of information over a period of time further adding time diversity to the information. Thus an entire slot of information for a user is less likely to be lost since the information is spread across two or more slots. Channel coding introduces time diversity to information within a slot by adding information (e.g., bit padding—adding repetitive blocks of bits) to the information. Because channel coding actually adds information to the user information to be conveyed, it is costly since it reduces a system's overall capacity. Further, the time diversity introduced by channel coding is limited because such processing is restricted to within a slot. Interleaving reduces the likelihood that a user's entire slot of information would be lost.

Figure 3:
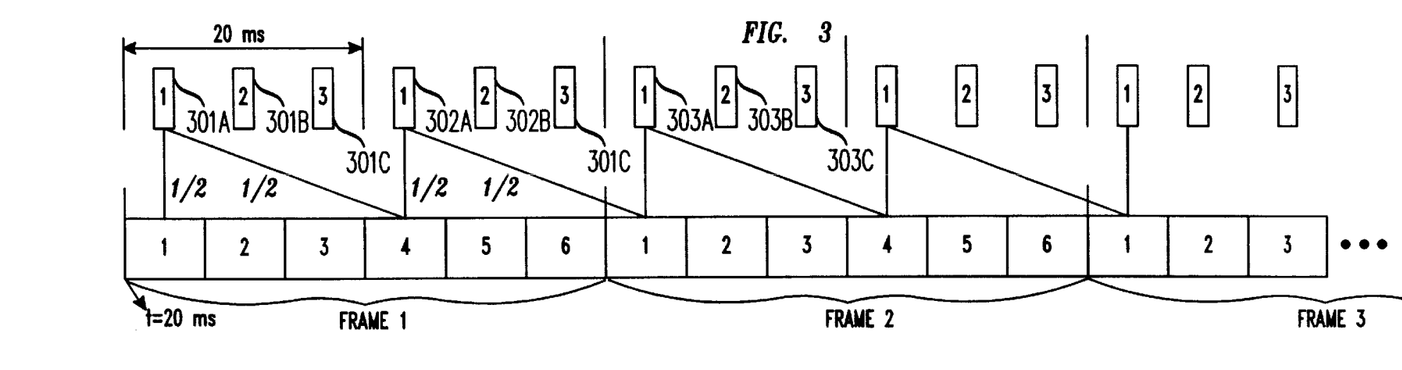
FIG. 3 illustrates the technique of 2-slot interleaving for a frame operating in the Full Rate mode.

Referring to FIG. 3, there is shown the traditional 2-slot interleaving process for an IS-136 compliant TDMA system in the Full Rate mode; this interleaving scheme is referred to as the IS-136 1-4 interleaving scheme and is currently used in IS-136 TDMA communication systems. There are three users per frame, User A, user B, user C. Information to be transmitted by each of the users are stored in their respective buffers (i.e., temporary storage devices). That is, user A information is stored in buffer 301A, 302A, 303A etc . . . , user B information is stored in buffer 301B, 302B, 303B, etc . . . and user C information is stored in buffer 301C, 302C, 303C, etc . . . The capacity of each of the buffers is expressed in terms of time. For example, all of the buffers in FIG. 3 are 20 millisecond buffers meaning that all buffers transfer information at a certain rate and thus the time duration for transferring information determines the amount of information transferred. Similarly, each slot has an associated capacity that depends on the rate of transmission of information and the time duration of the slot. Note, the fractions shown (i.e., ½) next to the lines going from a buffer to a time slot indicate a specific portion of the information stored in the buffer that is being transmitted during that time slot.

Thus, as shown in FIG. 3, interleaving is accomplished by transmitting ½ of each buffer in two different time slots. For example, for User A, ½ of the information in buffer 301A is transmitted in time slot 1 and ½ of the information is transmitted in time slot 4 of the same frame (i.e., frame 1). In buffer 302A ½ of the information therein is combined/intermingled with half of the information from buffer 301A and that aggregate of information is transmitted in slot 4 of frame 1. The other half of the information is combined/intermingled with information from buffer 303A and that aggregate of information is transmitted in time slot 1 of the next frame (i.e., frame 2). This process continues so that all of user A's information is transmitted in slots 1 and 4. The information from user B is transmitted in the same manner as described above but using time slots 2 and 5. Similarly, the information from user C is also transmitted in the same manner but using time slots 3 and 6. Combining/intermingling of information refers to any process in which portions of different blocks of information are mixed forming an aggregate block of information. Thus, under adverse communication channel conditions where the entire information transmitted during a time slot has been corrupted, only ½ of the information from corresponding buffers are corrupted. When only ½ of the information from a buffer are corrupted (as opposed to all of the information being corrupted), the ability of current error correction techniques to successfully decode the information is enhanced.

There is a certain amount of delay in transmitting information when interleaving (as described above) is used. In the example discussed above, for user A, buffer 301A takes 20 milliseconds to be filled. Only ½ of the information stored in buffer 301A is transmitted in time slot 1. Buffer 302A takes another 20 milliseconds to be filled and then combined with half of the information from buffer 301A. It takes an additional 6.67 milliseconds to transmit the combined information from buffers 301A and 302A during time slot 4. Thus, there is a delay of 46.67 milliseconds (20 msec+20 msec+6.67 msec) before all of the information stored in buffer 301A is transmitted.

Figure 4:
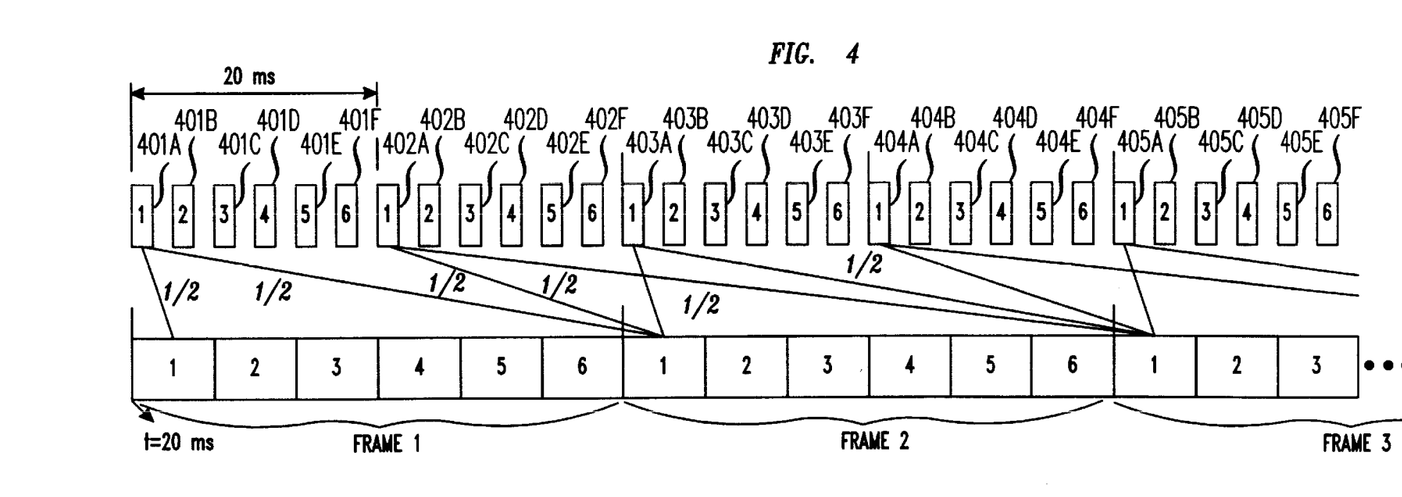
FIG. 4 illustrates the technique of 2-slot interleaving for a frame operating in the Half Rate mode.

The effectiveness of the interleaving process discussed above directly depends on how the adverse effects of the communication channel affect the different time slots over which information is interleaved. For example, for user A, when the channel adversely effects information transmitted in time slot 1 and there is a high probability that information transmitted during time slot 4 is also adversely affected, then interleaving over these two time slots will not be effective. It is therefore desirable that the channel be decorrelated between the slots over which information is interleaved. A channel that is decorrelated between two particular time slots is such that any adverse affects occurring during one of the time slots are statistically independent and unrelated to any adverse affects occurring in the other time slot. Moreover, the occurrence of adverse effects in one time slot does not necessarily intimate that the other time slot will be adversely affected at all. The decorrelation feature implies that interleaving will provide better results the further apart (in time) information from a particular buffer is interleaved. However, interleaving over slots further apart increases the amount of delay needed to transmit information significantly beyond the standard 46.67 msec. For example, FIG. 4 shows an IS-136 1-7 interleaving scheme for half rate mode (6 users) in which half of the information in a buffer is transmitted in one slot and the other half of the information is transmitted in a seventh slot (i.e., slot 1 of the next frame). For user A, ½ of the information in buffer 402A is transmitted in slot 1 of frame 2. The remaining ½ of the information from buffer 402A is combined/intermingled with ½ of the information in buffer 403A, ½ the information from buffer 404A, ½ the information from buffer 405A and transmitted during slot 1 of frame 3. Note that all four buffers (402A–405A) must be filled before the second ½ of buffer 402A can be transmitted during slot 1 of frame 3. Thus, there is a 4×20 msec=80 msec. of delay incurred before the second ½ of buffer 402A can be transmitted during slot 1 of frame 3. Additionally, there is the 6.67 msec. of time needed to transmit the combined information during slot 1 of frame 2. Therefore, the total delay for a 1-7 interleaving scheme for half rate mode is 4×20+6.67=86.67 msec., viz., 40 msec. more than the traditional IS-136 1-4 interleaving scheme for full rate mode.

All of the interleaving schemes discussed above involve transmitting ½ of the information in a buffer over two slots. Although the schemes discussed above are the traditional means by which interleaving has been performed, it is not necessary that exactly half of each buffer be transmitted in different slots. It is desirable that the slots over which interleaving is done be chosen to be decorrelated in order for the interleaving to be effective. To increase the effectiveness of the interleaving, the time difference between the chosen slots should be as large as possible, but not too large so as not to significantly increase the time it takes to transmit an entire buffer of information.

Therefore, there is a need to develop an effective method of interleaving information that will result in a reasonable amount of delay in transmitting the information and yet exploit as much as possible any decorrelation feature present in the communication channel through which the information is being transmitted.

SUMMARY OF THE INVENTION

The present invention provides a method for interleaving information conveyed over a wireless communication system. Current interleaving techniques only consider equally dividing information blocks before interleaving. The current invention demonstrates, however, that information blocks can be unequally divided and furthermore, divided differently from information block to the next prior to interleaving in order to reduce delay time. A certain portion of a block of information to be conveyed by a user is transmitted during an assigned time slot. The remaining portion of the block of information is transmitted with portions of other blocks of information for the same user during at least one other time slot. The time slots are chosen such that the amount of time it takes to transmit the entire block of information does not increase significantly compared to a traditional method of interleaving.

In particular, the method of the present invention provides a method for interleaving a block of information for a certain user with at least another block of information for the user over a certain time period (e.g., a frame). After the block of information is stored in a temporary storage device (i.e., a buffer), a certain portion of the block of information is transmitted during one part (e.g., time slot) of the time period. At least one other block of information is stored in another storage device. A remaining portion of the block of information is subsequently combined and/or intermingled with a portion of the at least one other block of information and transmitted during at least one other part of the time period.

DETAILED DESCRIPTION

The method of the present invention provides the steps of: storing a block of information of a user in a temporary storage device (e.g., buffers); storing at least one other block of information in at least one other temporary storage device. Combining and/or intermingling a portion of the block of information with a portion of the at least one other block of information to form a first aggregate block of information which is transmitted during part of the defined time period. The remaining portions of the block of information and the at least other block of information are combined and/or intermingled to form a second aggregate block of information which is transmitted during at least one other part of the defined time period.

Figure 5:
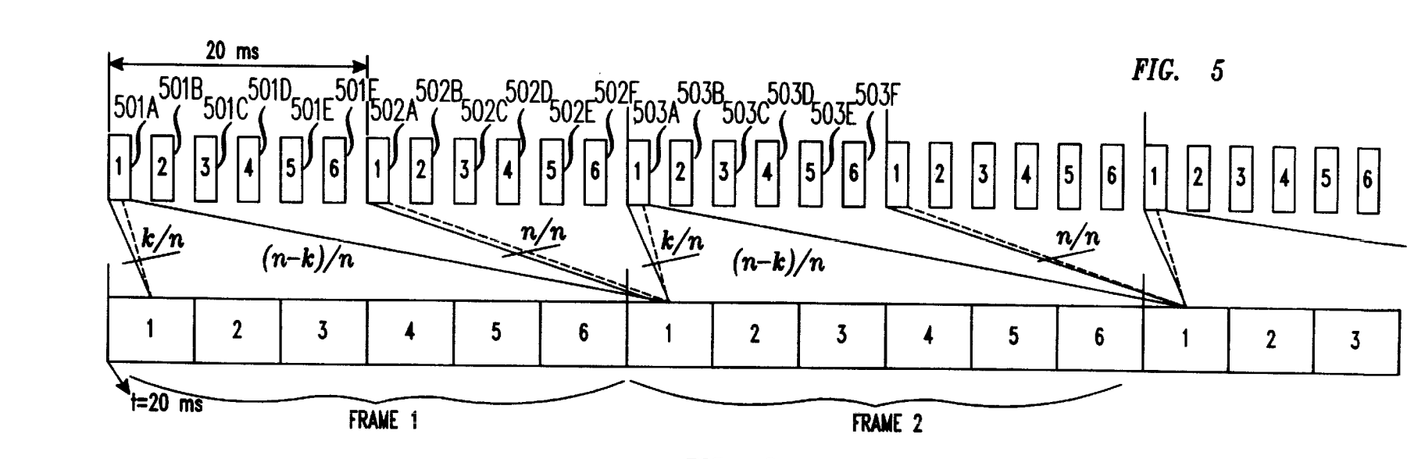
FIG. 5 depicts one embodiment of the interleaving scheme of the present invention.

Referring to FIG. 5, there is shown a defined time period 500 (e.g., frame) and temporary storage devices 501A, 501B, 501C . . . 502A, 502B, 502C etc . . . (e.g., buffers) for a communication system and when certain portions of the entire information stored in the storage devices are transmitted and combined and/or to achieve interleaving without significantly increasing the amount of time (compared to the traditional method) it takes to transmit the entire information stored in a particular storage device. The defined time period (e.g. a frame) is subdivided into equal parts 1–6 (e.g., slot 1, slot 2, slot 3, slot 4, slot 5 and slot 6) during which at least a portion of the information from at least one storage device is transmitted. It will be readily obvious that the defined time period need not be divided into equal parts, but can also be divided into unequal parts. Also, the number of parts can be any number established by a system provider or protocol. The amount of time it takes to transmit the entire information stored in a particular storage device is hereinafter referred to as the transmission delay. Each of the parts (e.g., slots) of the defined time period has an information capacity (e.g., slot capacity). The amount of information transmitted from various temporary storage devices is such that the information capacity of a time part (e.g., slot) used is not exceeded.

The frame format of FIG. 5 is consistent with an IS-136 compliant TDMA wireless communication system in the Half rate mode (i.e., six users assigned to a frame). Note that for this case the information capacity of the slot is equal to the amount of information that can be stored in two temporary storage devices. However, it should be noted that the method of the present invention is applicable to other standards (and other modes of operation) for TDMA wireless communication systems or other types of communication systems. FIG. 5 also shows a generic approach to an interleaving scheme commonly referred to as a "short 1-7 interleaving scheme." The method of the present invention is applicable to any interleaving scheme in which portions of a user's information is transmitted during part (e.g., time slot) of a defined period (frame).

Still referring to FIG. 5, frame 500 has an arrow pointing to the statement t=20 msec. indicating that it has taken 20 milliseconds to fill buffer 1. Two variables (k and n) are chosen to implement the interleaving where k<n and both k and n are integers greater than 0. The ratio k/n indicates the specific portion of information stored in buffer 501A that is transmitted during time slot 1 of frame 1. The remaining portion $$\left(\frac{n-k}{n}\right)$$

of the information in buffer 501A is transmitted during slot 1 of the next frame (i.e., frame 2) along with all (n/n) of the information in buffer 502A and a portion (k/n) of buffer 503A. For k=1 and n=2, three buffers (501A, 502A and 503A) must be filled before the remaining portion of the information stored in buffer 501A is transmitted during slot 1 of frame 2. Thus it takes a total of 3×20 msec.+6.67 msec.=66.67 msec. to transmit all of the information stored in buffer 501A. It will be readily obvious that a portion of the information (instead of all of the information) in buffer 502A can also be used to make up the aggregate information transmitted during slot 1 of frame 2. A similar analysis applies to all of the buffers shown in FIG. 5; that is the transmission delay for the short 1-7 scheme is 66.67 msec., viz., only 20 msec. more than the traditional 1-4 interleaving method. For k=2 and n=3, ⅔ of the information of buffer 501A is transmitted during slot 1 of frame 1 and during slot 1 of the next frame (i.e., frame 2) ⅔ of the information in buffer 502A, ⅔ of the information of buffer 503A and the remaining ⅓ of the information in buffer 501A are transmitted. Although the transmission delay is still 66.67 msec. the interleaving achieved for k=2 and n=3 is clearly different for different values of k and n. Simulations from which performance curves (not shown) are derived show that no severe performance degradation is suffered when the short 1-7 interleaving scheme is used for various values of k and n.

It will be readily understood that values for k and n other than the ones discussed above can be chosen. It will be further understood that the method of the present invention can also be applied to the IS-136 Full Rate 1-4 interleaving scheme. In such a case, the transmission delay for the IS-136 Full Rate 1-4 interleaving scheme would still be 46.67 msec. However, the information would be interleaved differently because the amount of information transmitted during each assigned slot would depend on the particular values of k and n.

Figure 6:
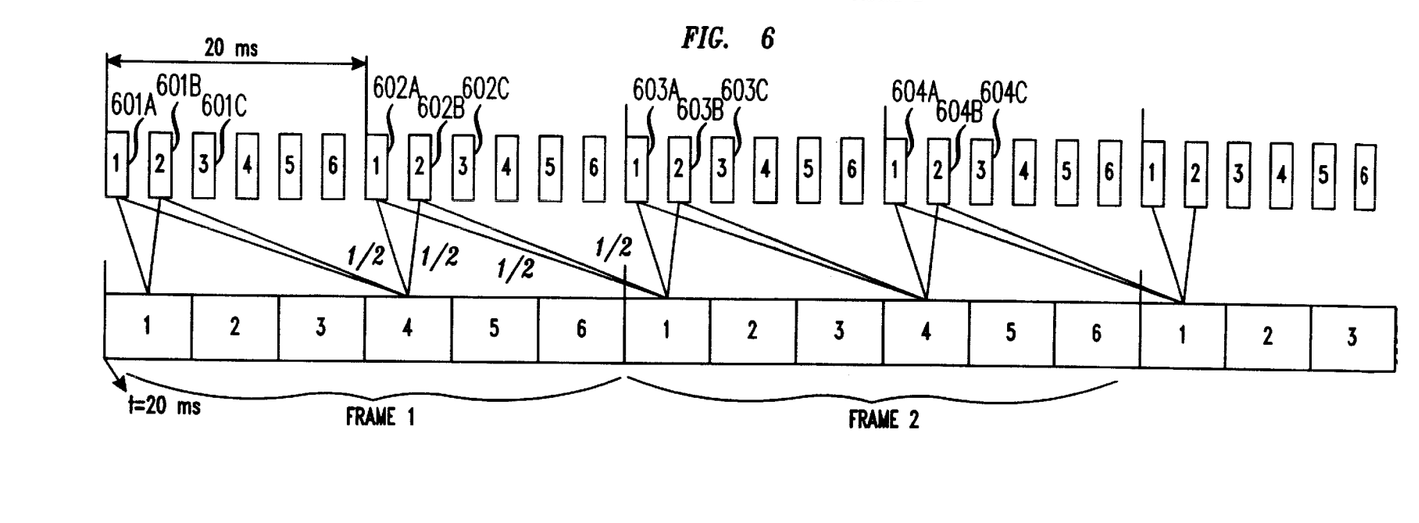
FIGS. 6–10 depict various versions of slot co-share interleaving embodiments of the present invention.

Interleaving of information can also be achieved by combining/intermingling information from different users in the same slot. This technique is called slot co-share interleaving. Referring to FIGS. 6–10 show different versions of slot co-share interleaving. Referring to FIG. 6 it is shown that both user A and user B transmit an aggregate block of information comprising ½ of the information buffer 601A and ½ of the information in buffer 601B which aggregate block of information is transmitted during slot 1 of frame 1. The remaining ½ of the information in buffer 601A and the remaining ½ of the information in buffer 601B are combined and/or intermingled with ½ of a new stored block of information (i.e., buffer 602A) and ½ of a new at least other stored block of information (i.e., buffer 602B) to form a second aggregate block of information that is transmitted during slot 4 of the frame 1. Hence, the interleaving scheme in FIG. 6 is referred to as 1-4 slot interleaving with user 1-2 co-sharing. The scheme depicted in FIG. 6 allows six users to transmit information with only a 20 msec increase in the transmission delay relative to the traditional full rate 1-4 interleaving scheme. Note that the different portions combined and/or intermingled to form aggregate blocks of information need not be equal nor do such portions have to be ½. Any reasonable fraction of a stored block of information can be used.

Figure 7:
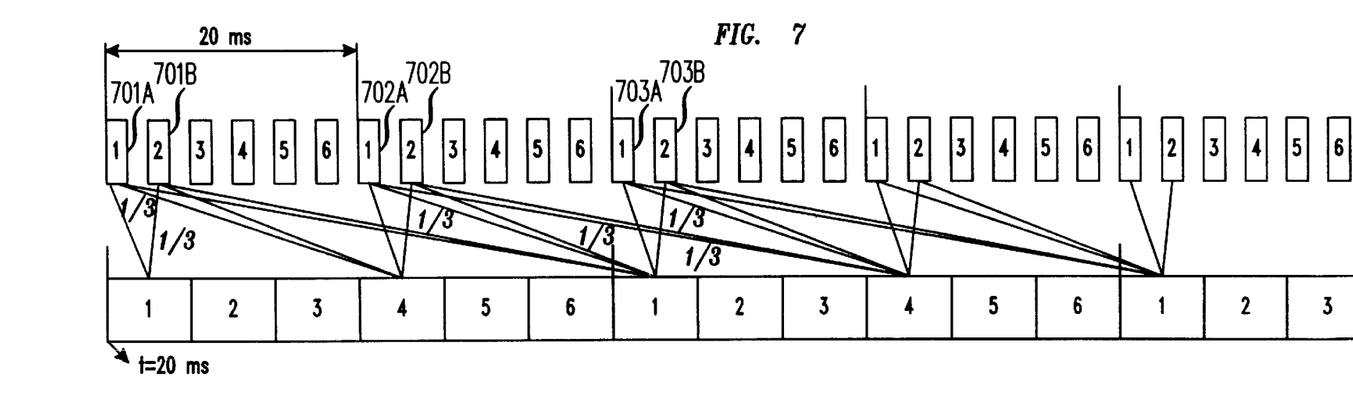
Figure 8:
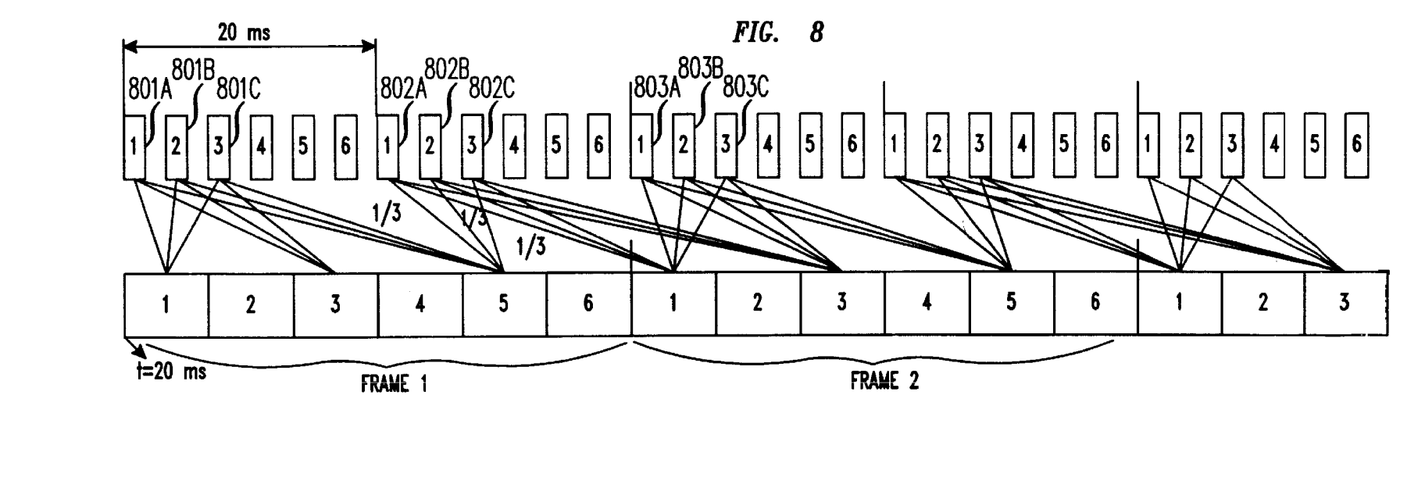

FIGS. 7–8 show two other slot co-share interleaving schemes where the information from the buffers is interleaved over three slots. FIG. 7 shows a 1-4-7 slot co-share interleaving scheme where users A and B share slots 1, 4, 7 (note slot 7 is slot 1 of the next frame). As shown in FIG. 7, a ⅓ of the information in each of three buffers (of user A and user B) is transmitted during each of the slots (i.e., slots 1, 4 and 7). The first and second aggregate blocks of information (similar to the 1-4 interleaving scheme) are transmitted during slot 1 and slot 4 respectively of frame 1. A third aggregate block of information is transmitted during slot 1 of the next frame which third aggregate block comprises remaining portions of the block of information (i.e., buffer 701A) and the at least one other block of information (i.e., buffer 701B), a remaining portion of the new block of information (i.e., buffer 702A), a remaining portion of the new at least other block of information (i.e., buffer 702B), a portion of a second new block of information (i.e., buffer 703A) and a portion of a second new at least one other block of information (i.e., buffer 703B). Although the scheme depicted in FIG. 7 requires an additional 20 msec. of transmission delay compared to the traditional 1-4 Full Rate interleaving scheme, it offers the advantage of dispersing the transmitted information from one buffer over three time slots. Note that the different portions combined and/or intermingled to form aggregate blocks of information need not be equal nor do such portions have to be ⅓. Any reasonable fraction of a stored block of information can be used.

FIG. 8 shows a 1-3-5 slot co-share interleaving scheme where users A, B and C share slots 1, 3 and 5. In the scheme depicted by FIG. 8 a ⅓ of the information stored in each of the buffers for each of the three users is transmitted in slots 1, 3 and 5 respectively. The first aggregate block of information, which comprises a portion of the block of information (i.e., buffer 801A), a portion of the at least one other block of information (i.e., buffer 801B), and a portion of a second block of information (i.e., buffer 801C), is transmitted during slot 1 of frame 1. The second aggregate block of information, which comprises portions of buffers 801A, 801B and 801C, is transmitted during slot 3 of frame 1. The third aggregate block of information, which comprises remaining portions of buffers 801A, 801B, 801C and portions of a new block (i.e., buffer 802A) of information, a new at least one other block of information (i.e., buffer 802B) and a second new block (i.e., buffer 802C) of information is transmitted during slot 5 of frame 1. The 1-3-5 slot co-share scheme has a transmission delay that is only 13.33 msec. more than the traditional Full Rate 1-4 interleaving scheme. Note that the different portions combined and/or intermingled to form aggregate blocks of information need not be equal nor do such portions have to be ⅓. Any reasonable fraction of a stored block of information can be used.

Figure 9:
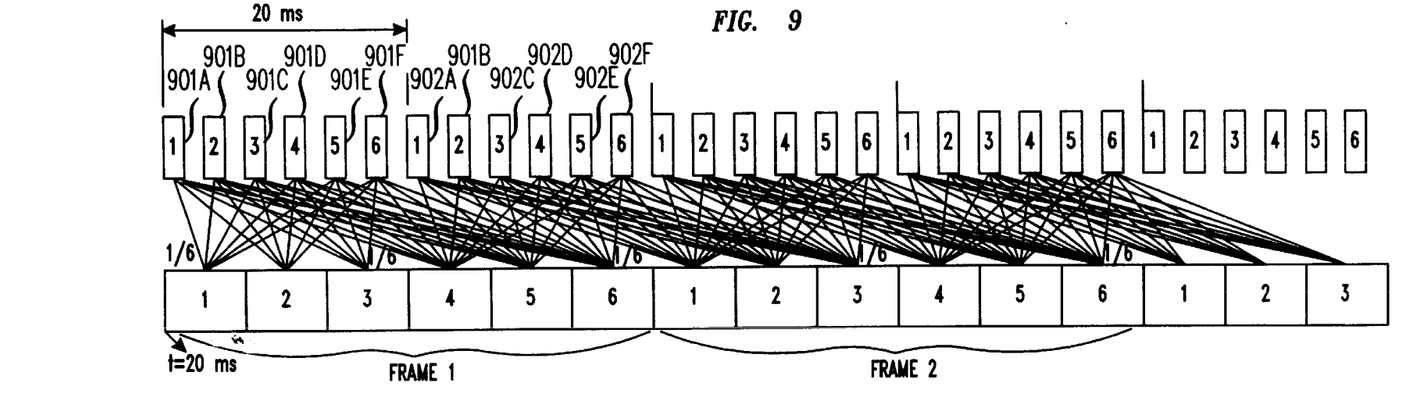
Figure 10:
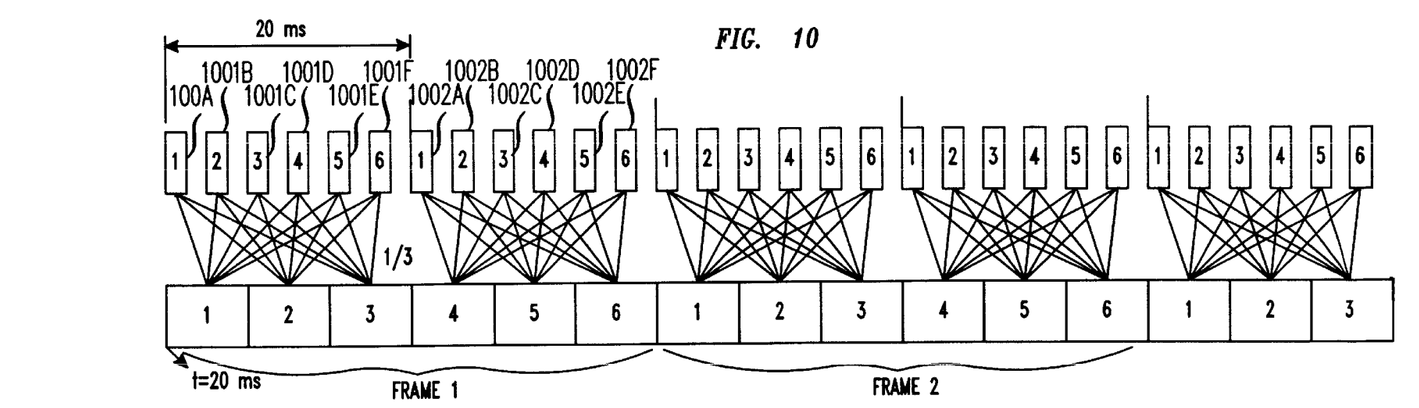

FIGS. 9–10 show interleaving schemes where the frame is shared by six users. FIG. 9 depicts a 1-2-3-4-5-6 slot co-share interleaving scheme where all six users intermingle their information among each other and transmit their information over six slots. For the first three slots (slot 1, slot 2 and slot 3) ⅙ of the information from each of the block of information and the at least one other block of information represented by buffers 901A, 901B, 901C, 901D, 901E and 901F are combined and/or intermingled to form a first three aggregate block of information. For slots 4–6, ⅙ of the information from buffers 901A–901F and buffers 902A–902F are combined and/or intermingled to form a second three aggregate blocks of information. The second three aggregate blocks of information are transmitted during slot 4, slot 5 and slot 6 respectively of frame 1. The transmission delay is 60 msec. which is only 13.33 msec more than the transmission delay for the traditional 1-4 Full Rate interleaving scheme. Note that the different portions combined and/or intermingled to form aggregate blocks of information need not be equal nor do such portions have to be ⅙. Any reasonable fraction of a stored block of information can be used.

For the scheme depicted by FIG. 10, all six users combine and/or intermingle portions of their stored blocks of information (i.e., buffers 1001A–1001F) to form three aggregates blocks of information which are transmitted during slot 1, slot 2 and slot 3 respectively of frame 1. Portions of new stored blocks of information (i.e., buffers 1002A–1002F) are combined and/or intermingled to form three new aggregate blocks of information which are transmitted during slot 4, slot 5 and slot 6 respectively of frame 1. For the scheme depicted by FIG. 10 the transmission delay is actually 6.67 msec. less than the transmission delay for the traditional Full Rate 1-4 interleaving scheme.

We claim:

1. A method of interleaving information conveyed in a communication system, the method comprising:

storing a block of information in a temporary storage device;

storing at least one other block of information in at least one other temporary storage device;

combining and/or intermingling a portion of the block of information with a portion of the at least other block of information to form a first aggregate block of information which aggregate block of information is transmitted during a part of the defined time period; and combining and/or intermingling remaining portions of the block of information ant the at least other block of information to form a second aggregate block of information which second aggregate block of information is transmitted during at least one other part of the defined time period where the portion of the block of information is equal to k/n, the remaining portion of the block of information is equal to $$\frac{n-k}{n},$$

the portion of the at least one other block of information is equal to n/k, where k is less than n, and k and n are integers greater than 0.

2. The method of claim 1 where the block of information and the at least one other block of information are from one user.

3. The method of claim 1 where the block of information and the at least one other block of information are from different users.

4. The method of claim 1 where the communication system is a TDMA IS-136 compliant wireless communication system where the defined time period is a frame divided into six equal time slots and the temporary storage devices are 20 millisecond buffers and the frame is followed by a next frame also divided into six equal time slots.

5. The method of claim 4 where the six equal time slots are slot 1, slot 2, slot 3, slot 4, slot 5 and slot 6.

6. The method of claim 5 where the first aggregate block of information is transmitted during slot 1 of the frame and the second aggregate block of information further comprises a portion of a new block of information which second aggregate block of information is transmitted during slot 1 of the next frame.

7. The method of claim 6 where the block of information and the at least one other block of information are from different users.

8. The method of claim 6 where the block of information and the at least one other block of information are from one user.

9. The method of claim 5 where the first aggregate block of information is transmitted during slot 1 of the frame and the second aggregate block of information further comprises a portion of a new block of information and a portion of a new at least one other block of information which second aggregate is transmitted during slot 4 of the frame.

10. The method of claim 9 where a third aggregate block of information comprising remaining portions of the block of information and the at least one other block of information, a remaining portion of the new block of information, a remaining portion of the new at least one other block of information, a portion of a second new block of information and a portion of a second new at least one other block of information which third aggregate block of information is transmitted during slot 1 of the next frame.

11. The method of claim 9 where the block of information and the at least other block of information are from one user.

12. The method of claim 9 where the block of information and the at least other block of information are from different users.

13. The method of claim 5 where the first aggregate block of information further comprises a portion of a second block of information which first aggregate block of information is transmitted during slot 1 of the frame.

14. The method of claim 13 where the second aggregate block of information further comprises a portion of the second block of information which second aggregate block of information is transmitted during slot 3 of the frame.

15. The method of claim 14 where a third aggregate block of information comprising remaining portions of the block of information, the at least one other block of information, the second block of information combined/intermingled with a portion of a new block of information, a portion of a new at least one other block of information and a portion of a new second block of information which third aggregate block of information is transmitted during slot 5 of the frame.

16. The method of claim 15 where the block of information, the at least one other block of information and the second block of information are from three different users.

17. The method of claim 15 where the block of information, the least one other block of information and the second block of information are from one user.

18. The method of claim 5 where the block of information and the at least other block of information form six different blocks of information each of which is divided into three portions and each of such portions is combined/intermingled with corresponding portions of the six different blocks of information to form a first, second and third aggregate block of information where the first aggregate block of information is transmitted during slot 1 of the frame, the second aggregate block is transmitted during slot 2 of the frame and the third aggregate block is transmitted during slot 3 of the frame.

19. The method of claim 18 where the six blocks of information are from six different users.

20. The method of claim 18 where the block of information and the at least other block of information form an additional six new block of information each of which is divided into three portions and each such portion is combined/intermingled with corresponding portions of the six different blocks of information to form a new first, a new second, and a new third aggregate block of information which new first aggregate block of information is transmitted during slot 4 of the frame, the new second aggregate block of information is transmitted during slot 5 of the frame and the new third aggregate block of information is transmitted during slot 6 of the frame.

21. The method of claim 20 where the six new blocks of information are from six different users.

22. The method of claim 5 where the block of information and the at least one other block of information form six different blocks of information where portions of the six different blocks of information are combined and/or intermingled with each other to form three aggregate blocks of information which three aggregate blocks of information are transmitted during slot 1, slot 2 and slot 3 respectively of the frame.

23. The method of claim 22 where the six blocks of information are from six different user.

24. The method of claim 22 where remaining portions of the six different blocks of information are combined and/or intermingled with portions of six new different blocks of information to form three new aggregate blocks of information which three new aggregate blocks of information are transmitted during slot 4, slot 5 and slot 6 respectively of the frame.

* * * * *